United States Patent [19]

Driscoll

[11] Patent Number: 5,694,592
[45] Date of Patent: Dec. 2, 1997

[54] PROCESS FOR DETERMINATION OF TEXT RELEVANCY

[75] Inventor: Jim Driscoll, Orlando, Fla.

[73] Assignee: University of Central Florida, Orlando, Fla.

[21] Appl. No.: 520,027

[22] Filed: Aug. 28, 1995

Related U.S. Application Data

[62] Division of Ser. No. 148,688, Nov. 5, 1993, Pat. No. 5,576,954.
[51] Int. Cl.$^6$ ..................................................... G06F 17/30
[52] U.S. Cl. ........................ 395/603; 395/604; 395/605; 395/759; 395/793
[58] Field of Search ....................... 395/600, 604, 395/603, 605, 759, 793; 364/300

[56] References Cited

U.S. PATENT DOCUMENTS

| | | | |
|---|---|---|---|
| 4,849,898 | 7/1989 | Adi | 364/419 |
| 4,942,526 | 7/1990 | Okajima et al. | 364/419 |
| 5,020,019 | 5/1991 | Ogawa | 364/900 |
| 5,056,021 | 10/1991 | Ausborn | 364/419 |

OTHER PUBLICATIONS

Driscoll et al., Text Retrieval Using a Comprehensive Semantic Lexicon, Proceedings of ISMM Interantional Conference, Nov.8–11 1992, pp. 120–129.
Driscoll et al., The QA System: The First Text REtrieval Conference (TREC-1), NIST Special Publication 500-207, Mar.,1993,pp. 199–207.

Primary Examiner—Thomas G. Black
Assistant Examiner—C. Lewis
Attorney, Agent, or Firm—Brian S. Steinberger; Law Offices of Brian S. Steinberger

[57] ABSTRACT

This is a procedure for determining text relevancy and can be used to enhance the retrieval of text documents by search queries. This system helps a user intelligently and rapidly locate information found in large textual databases. A first embodiment determines the common meanings between each word in the query and each word in the document. Then an adjustment is made for words in the query that are not in the documents. Further, weights are calculated for both the semantic components in the query and the semantic components in the documents. These weights are multiplied together, and their products are subsequently added to one another to determine a real value number(similarity coefficient) for each document. Finally, the documents are sorted in sequential order according to their real value number from largest to smallest value. Another, embodiment is for routing documents to topics/headings (sometimes referred to as faltering). Here, the importance of each word in both topics and documents are calculated. Then, the real value number (similarity coefficient) for each document is determined. Then each document is routed one at a time according to their respective real value numbers to one or more topics. Finally, once the documents are located with their topics, the documents can be sorted. This system can be used to search and route all kinds of document collections, such as collections of legal documents, medical documents, news stories, and patents.

9 Claims, 14 Drawing Sheets

Fig. 1

| | Thematic Role Categories | |
|---|---|---|
| 1 | TACM | Accompaniment |
| 2 | TAMT | Amount |
| 3 | TBNF | Beneficiary |
| 4 | TCSE | Cause |
| 5 | TCND | Condition |
| 6 | TCMP | Comparison |
| 7 | TCNV | Conveyance |
| 8 | TDGR | Degree |
| 9 | TDST | Destination |
| 10 | TDUR | Duration |
| 11 | TGOL | Goal |
| 12 | TINS | Instrument |
| 13 | TSPL | Location/Space |
| 14 | TMAN | Manner |
| 15 | TMNS | Means |
| 16 | TPUR | Purpose |
| 17 | TRNG | Range |
| 18 | TRES | Result |
| 19 | TSRC | Source |
| 20 | TTIM | Time |

| | Attribute Categories | |
|---|---|---|
| 21 | ACOL | Color |
| 22 | AEID | External and Internal Dimensions |
| 23 | AFRM | Form |
| 24 | AGND | Gender |
| 25 | AGDM | General Dimensions |
| 26 | ALDM | Linear Dimensions |
| 27 | AMFR | Motion Conjoined with Force |
| 28 | AGMT | Motion in General |
| 29 | AMDR | Motion with Reference to Direction |
| 30 | AORD | Order |
| 31 | APHP | Physical Properties |
| 32 | APOS | Position |
| 33 | ASTE | State |
| 34 | ATMP | Temperature |
| 35 | AUSE | Use |
| 36 | AVAR | Variation |

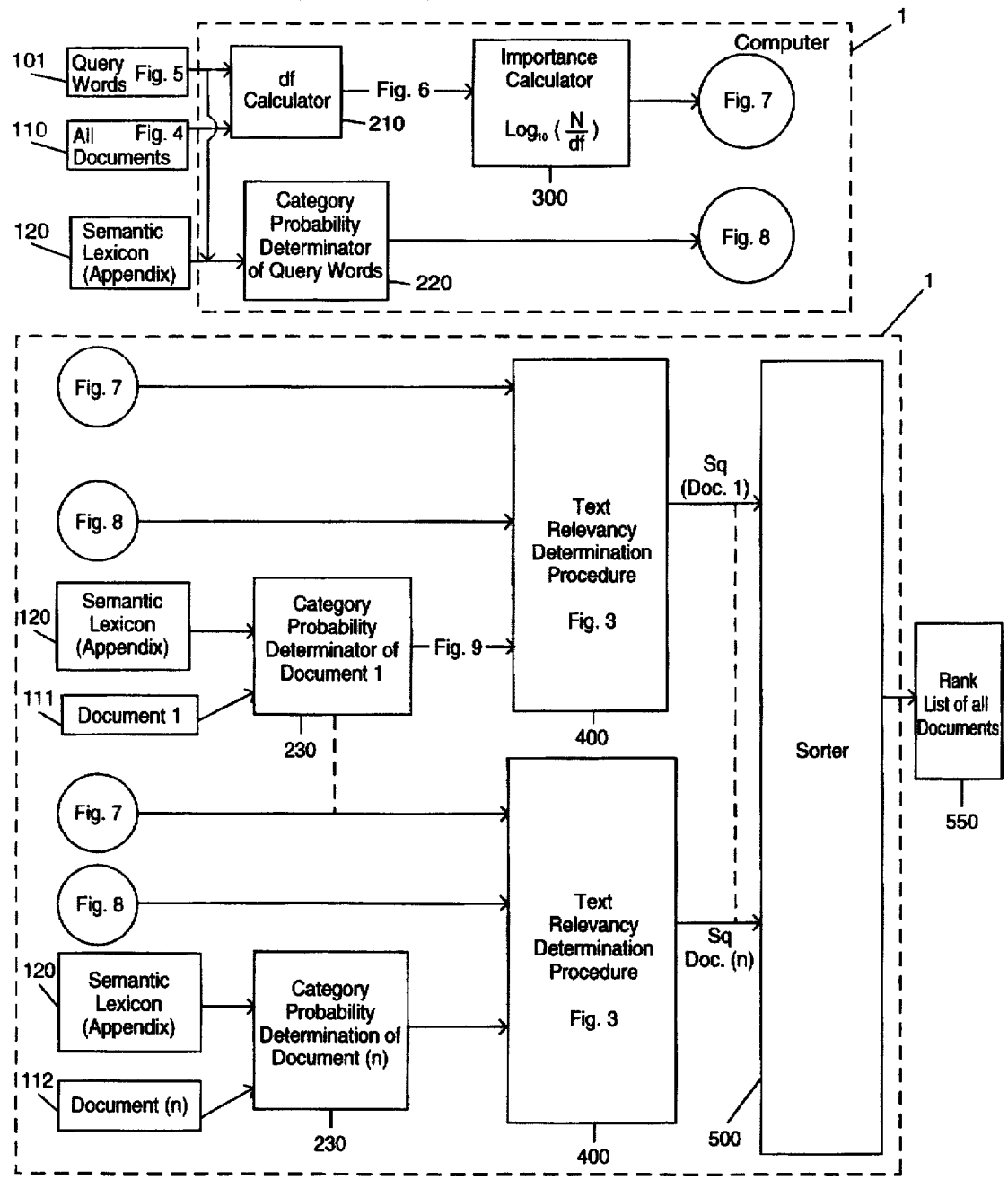

Text Relevancy Determination Procedure 400

Fig. 4

Document #1

Locomotives pull the trains.

Document #2

People meet people under the canopy and within trains.

Document #3

Trains carry freight from the station.

Document #4

Trains leave the station hourly until noon.

Fig. 5

Query

When do the trains depart the station?

Fig. 6

| word | number of documents the word is in (df) |
|---|---|
| and | 1 |
| canopy | 1 |
| carry | 1 |
| do | 0 |
| depart | 0 |
| freight | 1 |
| from | 1 |
| hourly | 1 |
| leave | 1 |
| locomotives | 1 |
| meet | 1 |
| noon | 1 |
| people | 1 |
| pull | 1 |
| station | 2 |
| the | 4 |
| trains | 4 |
| under | 1 |
| until | 1 |
| when | 0 |
| within | 1 |

Fig. 7

| word | importance of the word $\log_{10}\frac{n}{df}$ |
|---|---|
| and | .6 |
| canopy | .6 |
| carry | .6 |
| depart | undefined |
| do | undefined |
| freight | .6 |
| from | .6 |
| hourly | .6 |
| leave | .6 |
| locomotives | .6 |
| meet | .6 |
| noon | .6 |
| people | .6 |
| pull | .6 |
| station | .3 |
| the | 0 |
| trains | 0 |
| under | .6 |
| until | .6 |
| when | undefined |
| within | .6 |

Fig. 8

| word | frequency | category | probability |
|---|---|---|---|
| depart | 1 | AMDR<br>TAMT | 1/4<br>1/8 |
| do | 1 | AUSE<br>ATMP<br>TCSE<br>TCNV<br>TRES<br>TSRC | 1/21<br>1/21<br>1/21<br>2/21<br>1/21<br>1/21 |
| station | 1 | APOS<br>AORD<br>TAMT<br>TCND<br>TDGR<br>TSPL | 3/16<br>1/8<br>1/16<br>1/8<br>1/16<br>3/16 |
| the | 1 | ---- | ---- |
| trains | 1 | AORD<br>AMDR<br>AMFR<br>TACM<br>TCNV | 7/24<br>1/12<br>1/12<br>1/24<br>1/12 |
| when | 1 | TAMT<br>TTIM | 1/3<br>2/3 |

Fig. 9

| word | frequency | category | probability |
|---|---|---|---|
| hourly | 1 | TTIM | 1.0 |
| leave | 1 | AMDR<br>TAMT | 1/7<br>1/7 |
| noon | 1 | ALDM<br>TTIM | 1/3<br>2/3 |
| the | 1 | ---- | ---- |
| station | 1 | APOS<br>AORD<br>TAMT<br>TCNP<br>TDGR<br>TSPL | 3/16<br>1/8<br>1/16<br>1/8<br>1/16<br>3/16 |
| trains | 1 | AORD<br>AMDR<br>AMFR<br>TACM<br>TCNV | 7/24<br>1/12<br>1/12<br>1/24<br>1/12 |
| until | 1 | TTIM | 1.0 |

Fig. 10

Output of Step 1

First List

| Item Number | First Entry Word & Frequency in Query | Second Entry Word & Frequency in Document #4 | Third Entry Category |
|---|---|---|---|
| 1 | (depart,1) | (leave,1) | AMDR |
| 2 | (depart,1) | (trains,1) | AMDR |
| 3 | (depart,1) | (leave,1) | TAMT |
| 4 | (depart,1) | (station,1) | TAMT |
| 5 | (do,1) | (trains,1) | TCNV |
| 6 | (station,1) | (station,1) | APOS |
| 7 | (station,1) | (station,1) | AORD |
| 8 | (station,1) | (trains,1) | AORD |
| 9 | (station,1) | (leave,1) | TAMT |
| 10 | (station,1) | (station,1) | TAMT |
| 11 | (station,1) | (station,1) | TCND |
| 12 | (station,1) | (station,1) | TDGR |
| 13 | (station,1) | (station,1) | TSPL |
| 14 | (the,1) | (the,1) | --- |
| 15 | (trains,1) | (trains,1) | AORD |
| 16 | (trains,1) | (leave,1) | AMDR |
| 17 | (trains,1) | (trains,1) | AMDR |
| 18 | (trains,1) | (trains,1) | AMFR |
| 19 | (trains,1) | (trains,1) | TACM |
| 20 | (trains,1) | (trains,1) | TCNV |
| 21 | (when,1) | (leave,1) | TAMT |
| 22 | (when,1) | (hourly,1) | TTIM |
| 23 | (when,1) | (noon,1) | TTIM |
| 24 | (when,1) | (until,1) | TTIM |

Fig. 11

Output of Step 2

Second List

| Item Number | First Entry Word & Frequency in Query | Second Entry Word & Frequency in Document #4 | Third Entry |
|---|---|---|---|
| 1 | (leave,1) | (leave,1) | AMDR |
| 2 | (trains,1) | (trains,1) | AMDR |
| 3 | (leave,1) | (leave,1) | TAMT |
| 4 | (station,1) | (station,1) | TAMT |
| 5 | (trains,1) | (trains,1) | TCNV |
| 6 | (station,1) | (station,1) | APOS |
| 7 | (station,1) | (station,1) | AORD |
| 8 | (station,1) | (trains,1) | AORD |
| 9 | (station,1) | (leave,1) | TAMT |
| 10 | (station,1) | (station,1) | TAMT |
| 11 | (station,1) | (station,1) | TCND |
| 12 | (station,1) | (station,1) | TDGR |
| 13 | (station,1) | (station,1) | TSPL |
| 14 | (the,1) | (the,1) | --- |
| 15 | (trains,1) | (trains,1) | AORD |
| 16 | (trains,1) | (leave,1) | AMDR |
| 17 | (trains,1) | (trains,1) | AMDR |
| 18 | (trains,1) | (trains,1) | AMFR |
| 19 | (trains,1) | (trains,1) | TACM |
| 20 | (trains,1) | (trains,1) | TCNV |
| 21 | (leave,1) | (leave,1) | TAMT |
| 22 | (hourly,1) | (hourly,1) | TTIM |
| 23 | (noon,1) | (noon,1) | TTIM |
| 24 | (until,1) | (until,1) | TTIM |

Fig. 12

Output of Step 3

Third List

| Item Number | First Entry | Second Entry |
|---|---|---|
| 1 | .6 * 1 * 1/7=.0857 | .6 * 1 * 1/7=.0857 |
| 2 | 0 * 1 * 1/12=0 | 0 * 1 * 1/12=0 |
| 3 | .6 * 1 * 1/7=.0857 | .6 * 1 * 1/7=.0857 |
| 4 | .3 * 1 * 1/16=.0188 | .3 * 1 * 1/16=.0188 |
| 5 | 0 * 1 * 1/12=0 | 0 * 1 * 1/12=0 |
| 6 | .3 * 1 * 3/16=.0563 | .3 * 1 * 3/16=.0563 |
| 7 | .3 * 1 * 7/24=.0875 | .3 * 1 * 7/24=.0875 |
| 8 | .3 * 1 * 1/8=.0375 | 0 * 1 * 7/24=0 |
| 9 | .3 * 1 * 1/16=.0188 | .6 * 1 * 1/7=.0857 |
| 10 | .3 * 1 * 1/16=.0188 | .3 * 1 * 1/16=.0188 |
| 11 | .3 * 1 * 1/8=.0375 | .3 * 1 * 1/8=.0375 |
| 12 | .3 * 1 * 1/16=.0188 | .3 * 1 * 1/16=.0188 |
| 13 | .3 * 1 * 3/16-.0563 | .3 * 1 * 3/16-.0563 |
| 14 | 0 * 1=0 | 0 * 1=0 |
| 15 | 0 * 1 * 7/24=0 | 0 * 1 * 7/24=0 |
| 16 | 0 * 1 * 1/12=0 | .6 * 1 * 1/7=.0857 |
| 17 | 0 * 1 * 1/12=0 | 0 * 1 * 1/12=0 |
| 18 | 0 * 1 * 1/12=0 | 0 * 1 * 1/12=0 |
| 19 | 0 * 1 * 1/24=0 | 0 * 1 * 1/24=0 |
| 20 | 0 * 1 * 1/12=0 | 0 * 1 * 1/12=0 |
| 21 | .6 * 1 * 1/7=.0857 | .6 * 1 * 1/7=.0857 |
| 22 | .6 * 1 * 1.0=.6000 | .6 * 1 * 1.0=.6000 |
| 23 | .6 * 1 * 2/3=.4000 | .6 * 1 * 2/3=.4000 |
| 24 | .6 * 1 * 1.0=.6000 | .6 * 1 * 1.0=.6000 |

Fig. 13

Output of Step 4

Fourth List

| Item Number | Value |
|---|---|
| 1 | .00734 |
| 2 | 0 |
| 3 | .00734 |
| 4 | .00035 |
| 5 | 0 |
| 6 | .00317 |
| 7 | .00734 |
| 8 | 0 |
| 9 | .00170 |
| 10 | .00035 |
| 11 | .00141 |
| 12 | .00035 |
| 13 | .00317 |
| 14 | 0 |
| 15 | 0 |
| 16 | 0 |
| 17 | 0 |
| 18 | 0 |
| 19 | 0 |
| 20 | 0 |
| 21 | .00734 |
| 22 | .36000 |
| 23 | .16000 |
| 24 | .36000 |

Output of Step 5

Sum of all values in Fourth List 0.91986

Algorithm for Running
Text Relevancy Determination Procedure
for Document Sorting Algorithm for running Text Relevancy
Determination Procedure to Route Documents to Topics

PROCESS FOR DETERMINATION OF TEXT RELEVANCY

This is a Divisional of application Ser. No. 08/148,688 filed Nov. 5, 1993, now allowed on Nov. 19, 1996 as U.S. Pat. No. 5,576,954.

FIELD OF THE INVENTION

The invention relates generally to the field of determining text relevancy, and in particular to systems for enhancing document retrieval and document routing. This invention was developed with grant funding provided in part by NASA KSC Cooperative Agreement NCC 10-003 Project 2, for use with: (1) NASA Kennedy Space Center Public Affairs; (2) NASA KSC Smart O & M Manuals on Compact Disk Project; and (3) NASA KSC Materials Science Laboratory.

BACKGROUND AND PRIOR ART

Prior art commercial text retrieval systems which are most prevalent focus on the use of keywords to search for information. These systems typically use a Boolean combination of keywords supplied by the user to retrieve documents from a computer data base. See column 1 for example of U.S. Pat. No. 4,849,898, which is incorporated by reference. In general, the retrieved documents are not ranked in any order of importance, so every retrieved document must be examined by the user. This is a serious shortcoming when large collections of documents are searched. For example, some data base searchers start reviewing displayed documents by going through some fifty or more documents to find those most applicable. Further, Boolean search systems may necessitate that the user view several unimportant sections within a single document before the important section is viewed.

A secondary problem exists with the Boolean systems since they require that the user artificially create semantic search terms every time a search is conducted. This is a burdensome task to create a satisfactory query. Often the user will have to redo the query more than once. The time spent on this task is quite burdensome and would include expensive on-line search time to stay on the commercial data base.

Using words to represent the content of documents is a technique that also has problems of it's own. In this technique, the fact that words are ambiguous can cause documents to be retrieved that are not relevant to the search query. Further, relevant documents can exist that do not use the same words as those provided in the query. Using semantics addresses these concerns and can improve retrieval performance. Prior art has focussed on processes for disambiguation. In these processes, the various meanings of words(also referred to as senses) are pruned(reduced) with the hope that the remaining meanings of words will be the correct one. An example of well known pruning processes is U.S. Pat. No. 5,056,021 which is incorporated by reference.

However, the pruning processes used in disambiguation cause inherent problems of their own. For example, the correct common meaning may not be selected in these processes. Further, the problems become worse when two separate sequences of words are compared to each other to determine the similarity between the two. If each sequence is disambiguated, the correct common meaning between the two may get eliminated.

Accordingly, an object of the invention is to provide a novel and useful procedure that uses the meanings of words to determine the similarity between separate sequences of words without the risk of eliminating common meanings between these sequences.

SUMMARY OF THE INVENTION

It is accordingly an object of the instant invention to provide a system for enhancing document retrieval by determining text relevancy.

An object of this invention is to be able to use natural language input as a search query without having to create synonyms for each search query.

Another object of this invention is to reduce the number of documents that must be read in a search for answering a search query.

A first embodiment determines common meanings between each word in the query and each word in a document. Then an adjustment is made for words in the query that are not in the documents. Further, weights are calculated for both the semantic components in the query and the semantic components in the documents. These weights are multiplied together, and their products are subsequently added to one another to determine a real value number(similarity coefficient) for each document. Finally, the documents are sorted in sequential order according to their real value number from largest to smallest value.

A second preferred embodiment is for routing documents to topics/headings (sometimes referred to as filtering). Here, the importance of each word in both topics and documents are calculated. Then, the real value number(similarity coefficient) for each document is determined. Then each document is routed one at a time according to their respective real value numbers to one or more topics. Finally, once the documents are located with their topics, the documents can be stirred.

This system can be used on all kinds of document collections, such as but not limited to collections of legal documents, medical documents, news stories, and patents.

Further objects and advantages of this invention will be apparent from the following detailed description of preferred embodiments which are illustrated schematically in the accompanying drawings.

BRIEF DESCRIPTION OF THE FIGURES

FIG. 1 illustrates the 36 semantic categories used in the semantic lexicon of the preferred embodiment and their respective abbreviations.

FIG. 2 illustrates the first preferred embodiment of inputting a word query to determine document ranking using a text relevancy determination procedure for each document.

FIG. 4 shows an example of 4 documents that are to be ranked by the procedures of FIGS. 2 and 3.

FIG. 5 shows the natural word query example used for searching the documents of FIG. 4.

FIG. 6 shows a list of words in the 4 documents of FIG. 4 and the query of FIG. 5 along with the df value for the number of documents each word is in.

FIG. 7 illustrates a list of words in the 4 documents of FIG. 4 and the query of FIG. 5 along with the importance of each word.

FIG. 8 shows an alphabetized list of unique words from the query of FIG. 5; the frequency of each word in the query; and the semantic categories and probability each word triggers.

FIG. 9 is an alphabetized list of unique words from Document #4 of FIG. 4; and the semantic categories and probability each word triggers.

FIG. 10 is an output of the first step (Step 1) of the text relevancy determination procedure of FIG. 3 which determines the common meaning based on one of the 36 categories of FIG. 1 between words in the query and words in document #4.

FIG. 11 illustrates an output of the second step (Step 2) of the text relevancy determination procedure of FIG. 3 which allows for an adjustment for words in the query that are not in any of the documents.

FIG. 12 shows an output of the third step (Step 3) of the procedure of FIG. 3 which shows calculating the weight of a semantic component in the query and calculating the weight of a semantic component in the document.

FIG. 13 shows the output of fourth step (Step 4) of the procedure depicted in FIG. 3 which are the products caused by multiplying the weight in the query by the weight in the document, and which are then summed up in Step 5 and outputted to Step 6.

DESCRIPTION OF THE PREFERRED EMBODIMENT

Figure 3:
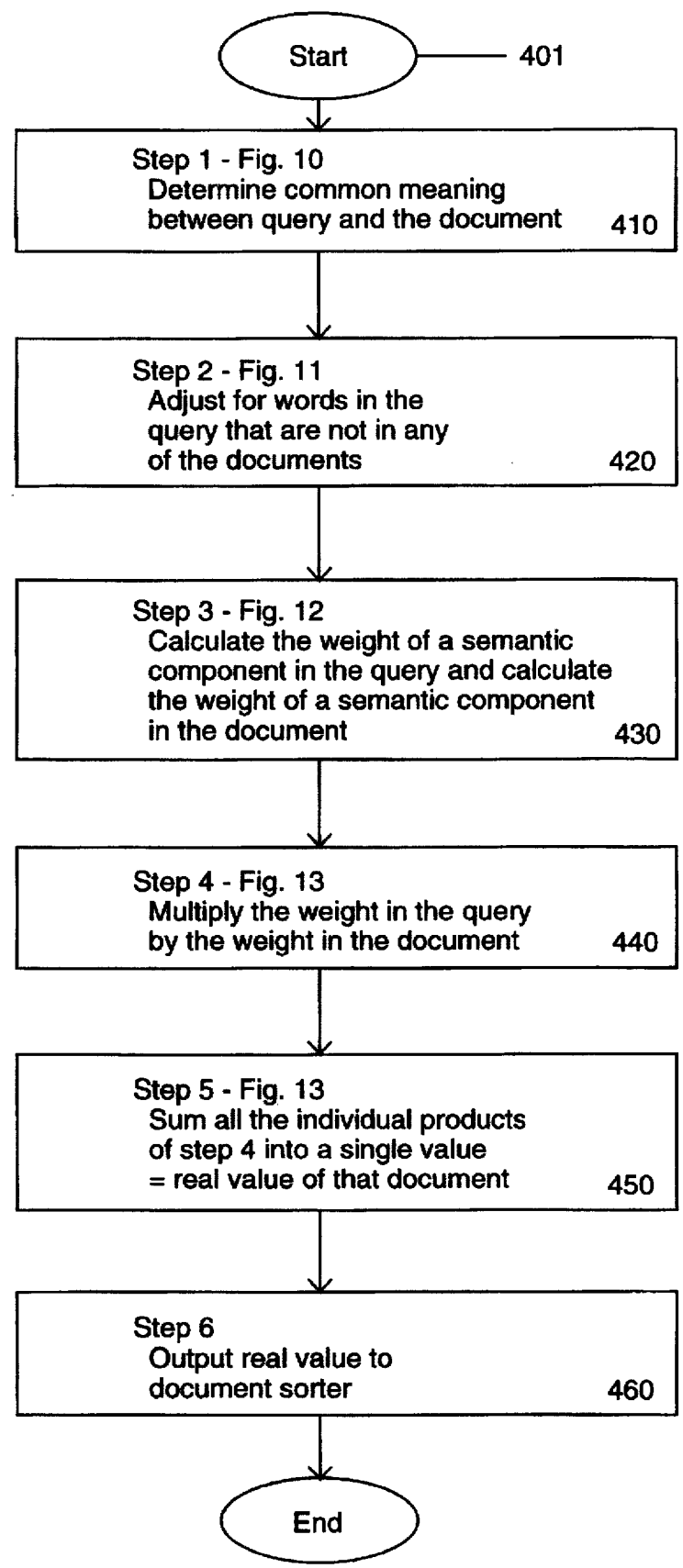
FIG. 3 illustrates the 6 steps for the text relevancy determination procedure used for determining real value numbers for the document ranking in FIG. 2.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The preferred embodiments were motivated by the desire to achieve the retrieval benefits of word meanings and avoid the problems associated with disambiguation.

A prototype of applicant's process has been successfully used at the NASA KSC Public Affairs office. The performance of the prototype was measured by a count of the number of documents one must read in order to find an answer to a natural language question. In some queries, a noticeable semantic improvement has been observed. For example, if only keywords are used for the query "How fast does the orbiter travel on orbit?" then 17 retrieved paragraphs must be read to find the answer to the query. But if semantic information is used in conjunction with key words then only 4 retrieved paragraphs need to be read to find the answer to the query. Thus, the prototype enabled a searcher to find the answer to their query by a substantial reduction of the number of documents that must be read.

Reference will now be made in detail to the present preferred embodiment of the invention as illustrated in the accompanying drawings.

Semantic Categories and Semantic Lexicon

A brief description of semantic modeling will be beneficial in the description or our semantic categories and our semantic lexicon. Semantic modelling has been discussed by applicant in the paper entitled NIST Special Publication 500-207-The First Text Retrieval Conference(TREC-1) published in March, 1993 on pages 199–207. Essentially, the semantic modeling approach identified concepts useful in talking informally about the real world. These concepts included the two notions of entities(objects in the real world) and relationships among entities(actions in the real world). Both entities and relationships have properties.

The properties of entities are often called attributes. There are basic or surface level attributes for entities in the real world. Examples of surface level entity attributes are General Dimensions, Color and Position. These properties are prevalent in natural language. For example, consider the phrase "large, black book on the table" which indicates the General Dimensions, Color, and Position of the book.

In linguistic research, the basic properties of relationships are discussed and called thematic roles. Thematic roles are also referred to in the literature as participant roles, semantic roles and case roles. Examples of thematic roles are Beneficiary and Time. Thematic roles are prevalent in natural language; they reveal how sentence phrases and clauses are semantically related to the verbs in a sentence. For example, consider the phrase "purchase for Mary on Wednesday" which indicates who benefited from a purchase(Beneficiary) and when a purchase occurred (Time).

A goal of our approach is to detect thematic information along with attribute information contained in natural language queries and documents. When the information is present, our system uses it to help find the most relevant document. In order to use this additional information, the basic underlying concept of text relevance needs to be modified. The modifications include the addition of a semantic lexicon with thematic and attribute information, and computation of a real value number for documents (similarity coefficient).

From our research we have been able to define a basic semantic lexicon comprising 36 semantic categories for thematic and attribute information which is illustrated in FIG. 1. Roget's Thesaurus contains a hierarchy of word classes to relate words. Roget's International Thesaurus, Harper & Row, New York, Fourth Edition, 1977. For our research, we have selected several classes from this hierarchy to be used for semantic categories. The entries in our lexicon are not limited to words found in Roget's but were also built by reading information about particular words in various dictionaries to look for possible semantic categories the words could trigger.

Further, if one generalizes the approach of what a word triggers, one could define categories to be for example, all the individual categories in Roget's. Depending on what level your definition applies to, you could have many more than 36 semantic categories. This would be a deviation from semantic modeling. But, theoretically this can be done.

Presently, the lexicon contains about 3,000 entries which trigger one or more semantic categories. The accompanying Appendix represents for 3,000 words in the English language which of the 36 categories each word triggers. The Appendix can be modified to include all words in the English language.

In order to explain an assignment of semantic categories to a given term using a thesaurus such as Roget's Thesaurus, for example, consider the brief index quotation for the term "vapor" on page 1294–1295, that we modified with our categories:

| Vapor | | | |
|---|---|---|---|
| noun | fog | State | ASTE |
| | fume | State | ASTE |
| | illusion | | |
| | spirit | | |
| | steam | Temperature | ATMP |
| | thing imagined | | |

| Vapor | | | |
|---|---|---|---|
| verb | be bombastic | | |
| | bluster | | |
| | boast | | |
| | exhale | Motion with Reference to Direction | AMDR |
| | talk nonsense | | |

The term "vapor" has eleven different meanings. We can associate the different meanings to the thematic and attribute categories given in FIG. 3. In this example, the meanings "fog" and "fume" correspond to the attribute category entitled -State-. The vapor meaning of "steam" corresponds to the attribute category entitled -Temperature-. The vapor meaning "exhale" is a trigger for the attribute category entitled -Motion with Reference to Direction-. The remaining seven meanings associated with "vapor" do not trigger any thematic roles or attributes. Since there are eleven meanings associated with "vapor", we indicate in the lexicon a probability of 1/11 each time a category is triggered. Hence, a probability of 2/11 is assigned to the category entitled -State- since two meanings "fog" and "fume" correspond. Likewise, a probability of 1/11 is assigned to the category entitled -Temperature-, and 1/11 is assigned to the category entitled -Motion with Reference to Direction-. This technique of calculating probabilities is being used as a simple alternative to an analysis to a large body of text. For example, statistics could be collected on actual usage of the word to determine probabilities.

Other interpretations can exist. For example, even though there are eleven senses for vapor, one interpretation might be to realize that only three different categories could be generated so each one would have a probability of 1/3.

Other thesauruses and dictionaries, etc. can be used to associate their word meanings to our 36 categories. Roget's thesaurus is only used to exemplify our process.

The enclosed appendix covers all the words that have listed so far in our data base into a semantic lexicon that can be accessed using the 36 linguistic categories of FIG. 1. The format of the entries in the lexicon is as follows:

<word> <list of semantic category abbreviations>.
For example:
<vapor> <ASTE ASTE NONE NONE ATMP NONE NONE NONE NONE AMDR NONE>,
where NONE is the acronym for a sense of "vapor" that is not a semantic sense.

FIRST PREFERRED EMBODIMENT

FIG. 2 illustrates an overview of using applicant's invention in order to be able to rank multiple documents in order of their importance to the word query. The overview will be briefly described followed by an example of determining the real value number (similarity coefficient SQ) for Document #4. In FIG. 2, the Query Words 101 and the documents 110 are input into the df calculator 210. The output of the df calculator 210 as represented in FIG. 6 passes to the Importance Calculator 300, whose output is represented by an example in FIG. 7. This embodiment further uses data from both the Query words 101, and the Semantic Lexicon 120 to determine the category probability of the Query Words at 220, and whose output is represented by an example in FIG. 8. Each document 111, with the Lexicon 120 is cycled separately to determine the category probability of each of those document's words at 230, whose output is represented by an example in FIG. 9. The outputs of 300, 220, and 230 pass to the Text Determination Procedure 400 as described in the six step flow chart of FIG. 3 to create a real number value for each document, SQ. These real value numbers are passed to a document sorter 500 which ranks the relevancy of each document in a linear order such as a downward sequential order from largest value to smallest value. Such a type of document sorting is described in U.S. Pat. No. 5,020,019 issued to Ogawa which is incorporated by reference.

It is important to note that the word query can include natural language words such as sentences, phrases, and single words as the word query. Further, the types of documents defined are variable in size. For example, existing paragraphs in a single document can be separated and divided into smaller type documents for cycling if there is a desire to obtain real number values for individual paragraphs. Thus, this invention can be used to not only locate the best documents for a word query, but can locate the best sections within a document to answer the word query. The inventor's experiments show that using the 36 categories with natural language words is an improvement over relevancy determination based on key word searching. And if documents are made to be one paragraph comprising approximately 1 to 5 sentences, or 1 to 250 words, then performance is enhanced. Thus, the number of documents that must be read to find relevant documents is greatly reduced with our technique.

FIG. 3 illustrates the 6 steps for the Text Relevancy Determination Procedure 400 used for determining document value numbers for the document ranking in FIG. 2. Step 1 which is exemplified in FIG. 10, is to determine common meanings between the query and the document. Step 2, which is exemplified in FIG. 11, is an adjustment step for words in the query that are not in any of the documents. Step 3, which is exemplified in FIG. 12, is to calculate the weight of a semantic component in the query and to calculate the weight of a semantic component in the document. Step 4, which is exemplified in FIG. 13, is for multiplying the weights in the query by the weights in the document. Step 5, which is also exemplified in FIG. 13, is to sum all the individual products of step 4 into a single value which is equal to the real value for that particular document. Step 6 is to output the real value number(SQ) for that particular document to the document sorer. Clearly having 6 steps is to represent an example of using the procedure. Certainly one can reduce or enlarge the actual number of steps for this procedure as desired.

An example of using the preferred embodiment will now be demonstrated by example through the following figures. FIG. 4 illustrates 4 documents that are to be ranked by the procedures of FIGS. 2 and 3. FIG. 5 illustrates a natural word query used for searching the documents of FIG. 4. The Query of "When do trains depart the station" is meant to be answered by searching the 4 documents. Obviously documents to be searched are usually much larger in size and can vary from a paragraph up to hundreds and even thousands of pages. This example of four small documents is used as an instructional bases to exemplify the features of applicant's invention.

First, the df which corresponds to the number of documents each word is in must be determined. FIG. 6 shows a list of words from the 4 documents of FIG. 4 and the query of FIG. 5 along with the number of documents each word is in(df). For example the words "canopy" and "freight" appear only in one document each, while the words "the" and "trains" appears in all four documents. Box 210 represents the df calculator in FIG. 2.

Next, the importance of each word is determined by the equation $Log_{10}(N/df)$. Where N is equal to the total number of documents to be searched and df is the number of documents a word is in. The df values for each word have been determined in FIG. 6 above. FIG. 7 illustrates a list of words in the 4 documents of FIG. 4 and the query of FIG. 5 along with the importance of each word. For example, the importance of the word "station"=$Log_{10}(4/2)=0.3$. Sometimes, the importance of a word is undefined. This happens when a word does not occur in the documents but does occur in a query(as in the embodiment described herein). For example, the words "depart", "do" and "when" do not appear in the four documents. Thus, the importance of these terms cannot be defined here. Step 2 of the Text Relevancy Determination Procedure in FIG. 11 to be discussed later adjusts for these undefined values. The importance calculator is represented by box 300 in FIG. 2.

Next, the Category Probability of each Query word is determined. FIG. 8 illustrates this where each individual word in the query is listed alphabetically with the frequency that each word occurs in that query, the semantic category triggered by each word, and the probability that each category is triggered. FIG. 8 shows an alphabetized list of all unique words from the query of FIG. 5; the frequency of each word in the query; and the semantic categories and probability each word triggers. For our example, the word "depart" occurs one time in the query. The entry for "depart" in the lexicon corresponds to this interpretation which is as follows:

<DEPART> <NONE NONE NONE NONE NONE AMDR AMDR TAMT>.

The word "depart" triggers two categories: AMDR (Motion with Reference to Direction) and TAMT(Amount). According to an interpretationg of this lexicon, AMDR is triggered with a probability ¼ of the time and TAMT is triggered ⅛ of the time. Box 220 of FIG. 2 determines the category probability of the Query words.

Further, a similar category probability determination is done for each document. FIG. 9 is an alphabetized list of all unique words from Document #4 of FIG. 4; and the semantic categories and probability each word triggers. For example, the word "hourly" occurs 1 time in document #4, and triggers the category of TTIM(Time) a probability of 1.0 of the time. As mentioned previously, the lexicon is interpreted to show these probability values for these words. Box 230 of FIG. 2 determines the category probability for each document.

Next the text relevancy of each document is determined.

Text Relevancy Determination Procedure-6 Steps

The Text Relevancy Determination Procedure shown as boxes 410-460 in FIG. 2 uses 3 of the lists mentioned above:

1) List of words and the importance of each word, as shown in FIG. 7;

2) List of words in the query and the semantic categories they trigger along with the probability of triggering those categories, as shown in FIG. 8; and 3) List of words in a document and the semantic categories they trigger along with the probability of triggering those categories, as shown in FIG. 9.

These lists are incorporated into the 6 STEPS referred in FIG. 3.

STEP 1

Step 1 is to determine common meanings between the query and the document at 410. FIG. 10 corresponds to the output of Step 1 for document #4.

In Step 1, a new list is created as follows: For each word in the query, go through either subsections (a) or (b) whichever applies. If the word triggers a category, go to section (a). If the word does not trigger a category go to section (b).

(a) For each category the word triggers, find each word in the document that triggers the category and output three things:

1) The word in the Query and its frequency of occurrence.

2) The word in the Document and its frequency of occurrence.

3) The category.

(b) If the word does not trigger a category, then look for the word in the document and if it's there output two things:

1) The word in the Query and it's frequency of occurrence.

2) The word in the Document and it's frequency of occurrence.

3) —.

In FIG. 10, the word "depart" occurs in the query one time and triggers the category AMDR. The word "leave" occurs in Document #4 once and also triggers the category AMDR. Thus, item 1 in FIG. 10 corresponds to subsection a) as described above. An example using subsection b) occurs in Item 14 of FIG. 10.

STEP 2

Step 2, is an adjustment step for words in the query that are not in any of the documents at 420. FIG. 11 shows the output of Step 2 for document #4.

In this step, another list is created from the list depicted in Step 1. For each item in the Step 1 List which has a word with undefined importance, then replace the word in the First Entry column by the word in the Second Entry column. For example, the word "depart" has an undefined importance as shown in FIG. 7. Thus, the word "depart" is replaced by the word "leave" from the second column. Likewise, the words "do" and "when" also have an undefined importance and are respectively replaced by the words from the second entry column.

STEP 3

Step 3 is to calculate the weight of a semantic component in the query and to calculate the weight of a semantic component in the document at 430. FIG. 12 shows the output of Step 3 for document #4.

In Step 3, another list is created from the Step 2 list as follows:

For each item in the Step 2 list, follow subsection a) or b) whichever applies:

a) If the third entry is a category, then
  1. Replace the first entry by multiplying:
  importance of    frequency of    probability the word
  word in       *  word in      *  triggers the category
  first entry      first entry     in the third entry
  2. Replace the second entry by multiplying:
  importance of    frequency of    probability the word
  word in       *  word in      *  triggers the category
  second entry     second entry    in the third entry
  3. Omit the third entry.

b) If the third entry is not a category, then
  1. Replace the first entry by multiplying:
  importance of    frequency of
  word in       *  word in
  first entry      first entry
  2. Replace the second entry by multiplying:
  importance of    frequency of
  word in       *  word in
  second entry     second entry
  3. Omit the third entry.

Item 1 in FIGS. 11 and 12 is an example of using subsection a), and item 14 is an example of utilizing subsection b).

STEP 4

Step 4 is for multiplying the weights in the query by the weights in the document at 440. The top portion of FIG. 13 shows the output of Step 4.

In the list created here, the numerical value created in the first entry column of FIG. 12 is to be multiplied by the numerical value created in the second entry column of FIG. 12.

STEP 5

Step 5 is to sum all the values in the Step 4 list which becomes the real value number (Similarity Coefficient SQ) for a particular documentat at 450. The bottom portion of FIG. 13 shows the output of step 5 for Document #4

STEP 6

This step is for outputting the real value number for the document to the document sorter illustrated in FIG. 2 at 460.

Steps 1 through 6 are repeated for each document to be ranked for answering the word query. Each document eventually receives a real value number(Similarity Coefficient). Sorter 500 depicted in FIG. 2 creates a ranked list of documents 550 based on these real value numbers. For example, if Document #1 has a real value number of 0.88, then the Document #4 which has a higher real value number of 0.91986 ranks higher on the list and so on.

In the example given above, there are several words in the query which are not in the document collection. So, the importance of these words is undefined using the embodiment described. For general information retrieval situations, it is unlikely that these cases arise. They arise fin the example because only 4 very small documents are participating.

Figure 14:
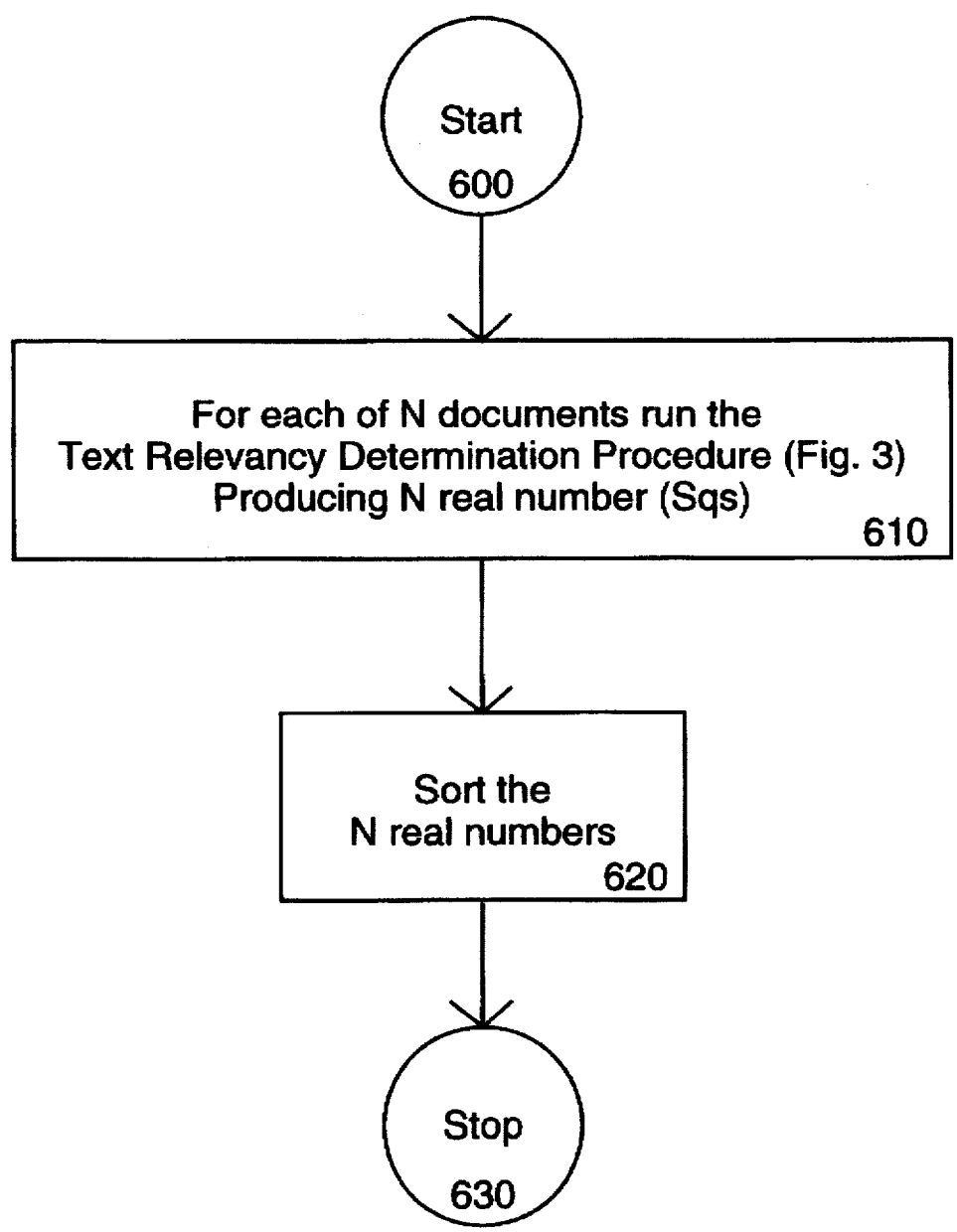
FIG. 14 illustrates an algorithm utilized for determining document ranking.

FIG. 14 illustrates a simplified algorithm for running the text relevancy determination procedure for document sorting. For each of N documents, where N is the total number of documents to be searched, the 6 step Text Relevancy Determination Procedure of FIG. 3 is run to produce N real value numbers (SQ) for each document 610. The N real value numbers are then sorted 620.

SECOND PREFERRED EMBODIMENT

This embodiment covers using the 6 step procedure to route documents to topics or headings also referred to as filtering. In routing documents there is a need to send documents one at a time to whichever topics they are relevant too. The procedure and steps used for document sorting mentioned in the above figures can be easily modified to handle document routing. In routing, the role of documents and the Query is reversed. For example, when determining the importance of a word for routing, the equation can be equal to $Log_{10}(NT/dft)$, where NT is the total number of topics and dft is the number of topics each word is located within.

Figure 15:
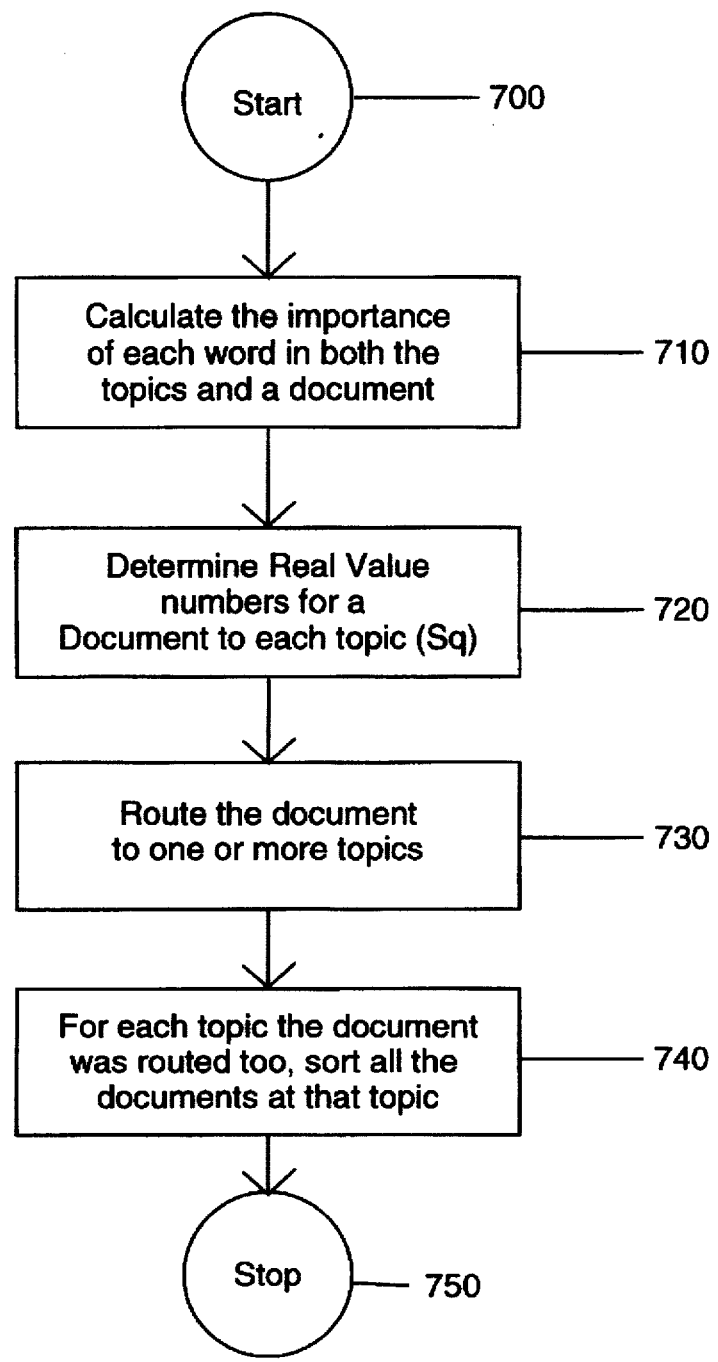
FIG. 15 illustrates an algorithm utilized for routing documents to topics.

FIG. 15 illustrates a simplified flow chart for this embodiment. First, the importance of each word in both a topic X, where X is an individual topic, and each word in a document, is calculated 710. Next, real value numbers(SQ) are determined 720, in a manner similar to the 6 step text relevancy procedure described in FIG. 3. Next, each document is routed one at a time to one or more topics 730. Finally, the documents are sorted at each of the topics 740.

This system can be used to search and route all kinds of document collections no matter what their size, such as collections of legal documents, medical documents, news stories, and patents from any sized data base. Further, as mentioned previously, this process can be used with a different number of categories fewer or more than our 36 categories.

The present invention is not limited to this embodiment, but various variations and modifications may be made without departing from the scope of the present invention.

I claim:

1. A computer implemented method of creating similarity coefficients between sequences of words in documents that are being searched in a database by a natural word query without parsing the query words nor the words in the documents, and without removing any of the query words and any of the words in the documents, the method comprising the steps of:

(a) branching out the meanings of each and every word in a natural word query into respective probabilities of occurrence for each of the meanings in the natural word query;

(b) branching out the meanings of words in a document searched by the natural word query into respective probabilities of occurrence for each of the meanings of the words in each of the documents;

(c) determining a similarity coefficient between the probabilities of occurrence of words in the natural language query and the probabilities of occurrence of the words in the document;

(d) repeating steps (a) to (c) for each additional document searched by the natural language query; and (e) ranking the documents being searched in order of their similarity coefficients without parsing of the natural language query and the documents, and without removing any words from the natural language query nor from the documents.

2. The computer implemented method of creating similarity coefficients between sequences of words of claim 1, wherein the meanings of a word further include definitions of words.

3. A computer implemented method of creating similarity coefficients between sequences of words of claim 1, wherein the meanings of a word further include senses.

4. A computer implemented method of creating similarity coefficients between sequences of words of claim 1, wherein the meanings of a word further include categories.

5. The computer implemented method of creating similarity coefficients between sequences of words of claim 4, wherein the categories further includes:

a semantic lexicon of categories.

6. The computer implemented method of creating similarity coefficients between sequences of words of claim 5, wherein step(a) further includes:

determining a probability value for each word in the query matching the semantic categories; and wherein step(b) further includes:

determining a probability value for each word in the document matching the semantic categories.

7. The computer implemented method of creating similarity coefficients between sequences of word of claim 6, wherein step(c) of determining similarity coefficients further includes:

(i) calculating weights of a semantic component in the query based on the probability values of the words in the query;

(ii) calculating weights of a semantic component in the document based on the probability values of the words in the document;

(iii) multiplying query component weights by document component weights into products; and (iv) adding the products together to represent the similarity coefficient as a real-value number for the document.

8. The computer implemented method of creating similarity coefficients between sequences of word of claim 1, wherein each document is chosen from at least one of:

a word, a sentence, a line, a phrase and a paragraph.

9. A computer implemented method of creating similarity coefficients between sequences of words in documents that are being searched in a database by a natural word query without parsing the query words nor the words in the documents, and without removing any of the query words and any of the words in the documents, the method comprising the steps of:

(a) branching out the meanings of each and every word in a natural word query into respective probabilities of occurrence for each of the meanings in the natural word query, wherein the query includes at least one word;

(b) branching out the meanings of each and every word in a document searched by the natural word query into respective probabilities of occurrence for each of the meanings of the words in each of the documents, wherein the document includes at least one word;

(c) determining a similarity coefficient between the probabilities of occurrence of words in the natural language query and the probabilities of occurrence of the words in the document;

(d) repeating steps (a) to (c) for each additional document searched by the natural language query; and (e) ranking all the documents being searched in order of their similarity coefficients without parsing of the natural language query and the documents, and without removing any words from the natural language query nor from the documents.

* * * * *